(12) United States Patent
Niehues et al.

(10) Patent No.: US 8,945,271 B2
(45) Date of Patent: Feb. 3, 2015

(54) METHOD FOR PRODUCING UREA FERTILIZER WITH LOW MOISTURE ABSORPTION TENDENCIES

(75) Inventors: Paul Niehues, Dortmund (DE); Harald Franzrahe, Dortmund (DE); Matthias Potthoff, Dortmund (DE); Luc Albert Vanmarcke, Lembeke (BE)

(73) Assignee: Uhde Fertilizer Technology B.V., NW Roermond (NL)

( * ) Notice: Subject to any disclaimer, the term of this patent is extended or adjusted under 35 U.S.C. 154(b) by 0 days.

(21) Appl. No.: 13/822,541

(22) PCT Filed: Aug. 31, 2011

(86) PCT No.: PCT/EP2011/004398
§ 371 (c)(1),
(2), (4) Date: May 8, 2013

(87) PCT Pub. No.: WO2012/034650
PCT Pub. Date: Mar. 22, 2012

(65) Prior Publication Data
US 2013/0319060 A1    Dec. 5, 2013

(30) Foreign Application Priority Data
Sep. 15, 2010 (EP) .................... 10009615

(51) Int. Cl.
*C05C 9/00* (2006.01)
*C05C 3/00* (2006.01)
*C05G 3/00* (2006.01)

(52) U.S. Cl.
CPC ... *C05C 3/00* (2013.01); *C05C 9/00* (2013.01); *C05C 9/005* (2013.01); *C05G 3/0058* (2013.01)
USPC ....... 71/28; 71/29; 71/30; 71/64.02; 71/64.07

(58) Field of Classification Search
CPC .................................. C05C 9/00; C05C 9/005
USPC .................... 71/28–30, 64.07, 64.02
See application file for complete search history.

(56) References Cited

U.S. PATENT DOCUMENTS 3,205,061 A    9/1965  Mason et al.
3,372,019 A    3/1968  Fox et al.
(Continued)

FOREIGN PATENT DOCUMENTS

CN    101302123    11/2008
EP    0289074      11/1988
(Continued)

OTHER PUBLICATIONS

International Search Report for PCT/EP2011/004398, Completed by the European Search Patent Office on Nov. 23, 2011, All together 4 Pages.

*Primary Examiner* — Wayne Langel
(74) *Attorney, Agent, or Firm* — Brooks Kushman P.C.

(57) ABSTRACT

A method for producing urea granules having low moisture absorption capacity, with a urea granulator, having a granule flow inlet side and oppositely a granule flow outlet side, forming an axis alongside which granules from a urea solution and a urea/ammonium salt-stream are formed, whereby the solution and the salt-stream are sprayed as a mixture or separately via a feed system unit via various nozzles into the granulator onto a seed material. In this process the highest amount of the salt-stream is sprayed into the granulator at the granule flow inlet side and the amount of the salt-stream is decreased alongside the axis of the granulator from the granule flow inlet side to the granule flow outlet side.

20 Claims, 2 Drawing Sheets

(56) References Cited

U.S. PATENT DOCUMENTS

| | | | |
|---|---|---|---|
| 3,539,326 A * | 11/1970 | Otsuka et al. ............... | 71/28 |
| 3,725,029 A | 4/1973 | Blackmore et al. | |
| 3,785,796 A * | 1/1974 | Mann, Jr. ..................... | 71/28 |
| 4,701,353 A * | 10/1987 | Mutsers et al. .............. | 427/213 |
| 4,943,308 A * | 7/1990 | Vanmarcke et al. .......... | 71/29 |
| 5,120,345 A * | 6/1992 | Kayaert et al. ............... | 71/30 |
| 5,330,552 A * | 7/1994 | Rizzo ........................... | 71/30 |
| 5,851,261 A * | 12/1998 | Markusch et al. ........... | 71/64.07 |
| 6,159,252 A | 12/2000 | Schutte et al. | |
| 6,179,893 B1 * | 1/2001 | Bendix et al. ................ | 71/28 |
| 2004/0228978 A1 | 11/2004 | Jacob et al. | |
| 2008/0092614 A1 * | 4/2008 | Ingels et al. .................. | 71/30 |
| 2008/0289384 A1 * | 11/2008 | Myers et al. .................. | 71/29 |
| 2009/0084149 A1 * | 4/2009 | Van Der Werf et al. ...... | 71/28 |
| 2009/0107196 A1 * | 4/2009 | Jung ............................. | 71/59 |
| 2010/0186470 A1 * | 7/2010 | Xing et al. .................... | 71/27 |
| 2011/0214465 A1 * | 9/2011 | Peacock et al. ............... | 71/28 |
| 2012/0017659 A1 * | 1/2012 | Pursell et al. ................. | 71/29 |

FOREIGN PATENT DOCUMENTS

| | | |
|---|---|---|
| EP | 1695755 | 8/2006 |
| WO | 2005092486 | 10/2005 |

* cited by examiner

METHOD FOR PRODUCING UREA FERTILIZER WITH LOW MOISTURE ABSORPTION TENDENCIES

CROSS-REFERENCE TO RELATED APPLICATION

This application is the U.S. national phase of PCT Appln. No. PCT/EP2011/004398 filed on Aug. 31, 2011, which claims priority to EP Patent Appln. No. 10009615.5 filed on Sep. 15, 2010, the disclosures of which are incorporated in their entirety by reference herein.

The invention relates to a urea granulation process and to the urea granule produced by the process. The invention integrates a method for recycling ammonia salts which are currently emitted to other processes, for example to UAN or NPK processes or to a conventional urea production process. Ammonia salts are homogenously mixed into the urea granulator in the current invention so that the urea fertilizer shows low moisture absorption tendencies.

In a urea plant used air exiting a urea granulator that is equipped with a fluidized bed contains in addition to urea dust also ammonia. This ammonia contamination needs to be removed before the off-gas stream can be vented into the atmosphere.

Removing ammonia from an off-gas stream is a well-known technology as described in EP1695755A1, for example. Usually the off-gas stream is treated with an acidic scrubbing solution. This scrubbing solution can be easily manufactured by adding an acid such as nitric acid or sulphuric acid to water. The ammonia is removed from the gas stream by chemical absorption and converted to the corresponding ammonium salt. The use of nitric acid produces ammonium nitrate (AN), and the use of sulphuric acid produces ammonium sulphate (AS) respectively.

In such processes a bleed solution is produced which contains a low ammonium salt concentration and a high urea concentration. These solutions can either be discharged from the plant or, which is more favourable, added to the urea melt from the synthesis and granulated in a typical urea granulation plant. The product specification and quality are not influenced to a great degree by the addition of these small amounts of ammonium salts. The N content of the urea product is still above 46% N, so that the product is still a typical urea based fertiliser.

However there is a significant drawback when mixing urea and an ammonium salt that is the significant reduction in the critical relative humidity of the resulting product.

The critical relative humidity (CRH) of a salt is defined as the relative humidity of the surrounding atmosphere at which the material begins to absorb moisture from the atmosphere.

When the humidity of the atmosphere is equal to (or is greater than) the critical relative humidity of a sample of salt, the sample will take up water until all of the salt is dissolved to yield a saturated solution.

A product with a low critical humidity is difficult to store, transport and apply as it tends to cake and form lumps. At high air humidity's, such as found in marine or tropical environments, such a fertilizer can even be destroyed.

This is a phenomena exhibited by all ammonium salt fertilizers and many coating systems and coating substances have been developed to prevent the deterioration of the product. However, as urea normally has a relatively high critical humidity of over 70%, most urea producing plants do not need or have an installation to treat the product before storage. This would preclude the use of the proposed integrated ammonia recovery systems without added investments and would incur operating costs for coating.

When urea is mixed with ammonium salts however the critical humidity of the final product falls significantly. A mixture of urea and ammonium nitrate has a critical humidity of about 20%, a mixture of urea and ammonium sulphate of just 60%. These values would cause serious problems for the handling of the product. Therefore it is to be expected that such products must be treated before they leave the plants. Alternatively a way to prevent moisture pickup by the urea/ammonium salt granules must be developed.

The feed system of a urea granulator 3 as shown in FIG. 1a) consists of a feed system 5 from which the urea solution 4 is distributed to spray nozzles 6 inside of the urea granulator 3. In the state of the art system as shown here only urea solution is introduced into the urea granulator 3. Alternatively, as shown in FIG. 1b) urea solution 4 and a urea/ammonium salt-stream 8, containing urea and ammonium salt, is introduced into the urea granulator 3 separately or as a mixture at the granule flow inlet side 1 of the urea granulator only and this mixture flows counter current to the granules being built-up in the urea granulator 3. Consequently in both examples a product 7 is generated by passing through the granule flow inlet side 1 to the granule flow outlet side 2 consisting of a homogenous distribution of ammonia salt and urea. Therefore granules produced in this way show low critical humidity. The off-gas 14 of the urea granulator is subjected to common scrubbing systems state of the art and released into the atmosphere.

It is a technology state of the art to provide coatings of various natures on hygroscopic, water-soluble fertilizers to improve physical or agronomic properties of the product. In U.S. Pat. No. 3,205,061 a covering of the fertilizer with molten wax is described. The use of urethene resin to coat soluble fertilizers teaches U.S. Pat. No. 3,372,019. Hygroscopic fertilizers are commonly coated with water resistant sealants, such as oils, waxes, and other organic materials, to reduce moisture absorption and subsequent caking of the individual particles.

The various coated products show several drawbacks including low production rates, high operating costs as well as the requirement of large amounts of coating material that need to be used.

In EP0289074 a process for producing fertilizer granules containing urea and ammonium sulphate by granulation in a fluidized bed of particles is described. In this process separately prepared ammonium sulphate particles serving as nuclei are introduced. These ammonium sulphate nuclei are applied with urea by spraying an aqueous urea-containing liquid with a urea concentration of 70-99.9% by weight to the nuclei. The end product is a granulate having a core of ammonium sulphate coated with urea.

In U.S. Pat. No. 3,725,029 ammonium sulphate is granulated by using a specific binder. These particles are coated with molten urea and the coated particles are contacted with a dry powder as an anti-caking agent.

Both processes disclosed in EP0289074 and U.S. Pat. No. 3,725,029 use granulated ammonium sulphate as nuclei to generate the final granulate. Therefore both methods include the drawback that specific granulators for ammonium sulphate granulation are necessary leading to increased production costs.

SUMMARY OF THE INVENTION

The object of the invention therefore is to provide an alternative process which circumvents the above mentioned problems caused by the critical humidity of a mixture of urea and ammonium salt. Also the disadvantage and deficiencies of the fertilizers coated with a coating material should be eliminated by the current invention.

This is achieved by a method for producing urea granules having low moisture absorption capacity, with a urea granulator, having a granule flow inlet side and oppositely a granule flow outlet side, forming an axis alongside which urea granules from a urea solution and a urea/ammonium salt-stream are formed, whereby the urea solution and the urea/ammonium salt-stream are sprayed as a mixture or separately via a feed system unit via various nozzles into the urea granulator onto a seed material. In this process the highest amount of the urea/ammonium salt-stream is sprayed into the urea granulator at the granule flow inlet side and the amount of the urea/ammonium salt-stream is decreased alongside the axis of the urea granulator from the granule flow inlet side to the granule flow outlet side, whereby the urea/ammonia salt-stream comprises a urea:ammonium salt ratio between 4 and 20, a water content of 0-10% by weight and optionally up to 1-5% by weight additives, and the highest amount of the urea solution is sprayed into the urea granulator at the granule flow outlet side and the amount of the urea solution is decreased alongside the axis of the urea granulator from the granule flow outlet side to the granule flow inlet side.

Figure 1:
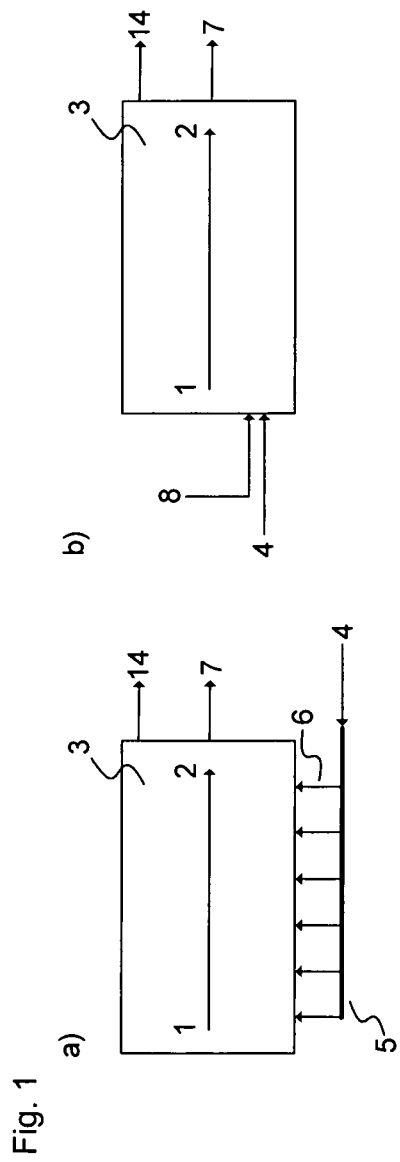
FIG. 1 illustrates a prior art method of producing urea granules with a low critical humidity.

Further embodiments of the current invention are related to the composition of the streams introduced into the urea granulator. Preferably, the stream introduced at the granule flow inlet side of the urea granulator consists exclusively of the urea/ammonium salt-stream and the stream introduced at the granule flow outlet side of the urea granulator consists exclusively of the urea solution without mixing both streams.

The urea/ammonium salt-stream comprises preferably a urea:ammonium salt ratio between 7 and 16. The water content of this stream preferably is 0-5% by weight. Optionally it comprises between 0.4 to 0.8% by weight additives. The additives for the urea/ammonium salt-stream are thereby selected from the group comprising formaldehyde, aluminium sulphate, magnesium sulphate, micronutrients, and other hydrocarbon granulation additives or mixtures thereof. As preferred additive formaldehyde is used.

The urea solution introduced at the granule flow outlet side of the urea granulator comprises a water content of 0-10% by weight, preferably a water content of 0-5% by weight and optionally up to 1.5% by weight additives, preferably between 0.4 to 0.8% by weight additives, whereby the weight additives are selected from the group comprising formaldehyde, aluminium sulphate, magnesium sulphate, micronutrients, and other hydrocarbon granulation additives or mixtures thereof. As preferred additive formaldehyde is used. Also it is possible that the urea solution comprises a minor content of impurities, as biuret.

The additives for the urea/ammonium salt-stream as well as for the urea solution are selected from the group comprising formaldehyde, aluminium sulphate, magnesium sulphate, micronutrients, and other hydrocarbon granulation additives or mixtures thereof. As preferred additive formaldehyde is used.

With advantage is the seed material chemically compatible with the produced urea granules. This means that the composition of the seed material can be of any natural or synthetic composition. Materials which are environmental friendly and degradable and not harmful to the soil and plants to be fertilized, are preferred. To give some examples, it can be soil, sand or biodegradable plastics. Also other fertilizers are possible. Mostly preferred are crushed oversized urea granules or undersized urea granules, which are produced by the current inventive process. This seed material has to be smaller than the wished end product. The seed material has an optimum size if it is 20-80% smaller than the wished end product, and preferably if it is 40-80% smaller than the end product, and most preferably if it is 60-80% smaller than the end product. To result in urea granules having low moisture absorption capacity it is important to choose the size of the starting material as small as possible, in order to ensure a totally covered seed material with urea solution.

Optionally, the highest amount of the urea/ammonium salt-stream is sprayed into the urea granulator at the granule flow inlet side and the amount of the urea/ammonium salt-stream sprayed into the urea granulator is reduced to zero within the first half of the axis of the granule flow inlet side to the granule flow outlet side, and preferably is reduced to zero within the first fifth of the axis of the granule flow inlet side to the granule flow outlet side.

It is advantageous if the urea/ammonium salt-stream is released from a scrubbing system for the removal of ammonia from the off-gas of a urea granulator.

It is known to a man state of the art that the temperature of the urea/ammonium salt-stream and the urea solution entering the urea granulator are above the melting temperature of these streams. It is also known that the melting temperature depends on the composition of the streams. Therefore a man skilled in the art would automatically choose a suitable temperature for both streams. With advantage the temperature of both streams are in the same range.

In a further embodiment of the current invention the pressure of the urea/ammonium salt-stream entering the feed system unit at the granule flow inlet side of the urea granulator is higher than the pressure of the urea solution entering the feed system unit at the granule flow outlet side of the urea granulator. This is to regulate the amount of urea/ammonium salt-stream and the amount of urea solution entering the feed system unit. In this way the composition of urea granules produced is regulated. Preferably the pressure of the urea/ammonium salt-stream entering the feed system unit at the granule flow inlet side of the urea granulator is 0.1-1 bar higher than the pressure of the urea solution entering the feed system unit at the granule flow outlet side of the urea granulator.

The described method for producing urea granules having low moisture absorption capacity is to be operated in a urea fluid bed granulation apparatus comprising an urea granulator, having a granule flow inlet side and oppositely a granule flow outlet side, forming an axis alongside which urea granules are formed, comprising a feed system unit for conveying urea solution and a urea/ammonium salt-stream, as a mixture or separately, via various spray nozzles into the urea granulator whereby the feed system unit is equipped with means for conveying the urea/ammonium salt-stream to the granule flow inlet side of the urea granulator and with means for conveying the urea solution to the granule flow outlet side of the urea granulator.

A further option of the apparatus is that the feed system unit is equipped with one or more headers having openings with same or different sizes conveying different amounts of the urea solution or the urea/ammonium salt-stream to nozzles being connected to the urea granulator. Also, the one or more headers having optionally means for adjusting the flow to the nozzles being connected to the urea granulator.

A further embodiment is that the urea fluid bed granulation apparatus comprises a scrubbing system, releasing the urea/ammonium salt-stream and a means for conveying the urea/ammonium salt-stream to the urea granulator.

Optionally the urea fluid bed granulation apparatus comprises means for pressurization of the urea/ammonium salt-stream and the urea solution. This pressurization step is optionally performed by means for self-regulation of the amount of urea/ammonium salt-stream and urea solution entering the feed system unit. This is for example a measurement of the ammonium salt-content in the urea/ammonium salt-stream connected with the pressurization of the respective streams. Therefore a constant product composition is ensured, independently of slight changes of the ammonium salt content in the urea/ammonium salt-stream.

Also claimed is the urea granule that is produced by the process for producing urea granules having low moisture absorption capacity, with a urea granulator, having a granule flow inlet side and oppositely a granule flow outlet side, forming an axis alongside which urea granules from a urea solution and a urea/ammonium salt-stream are formed, whereby the urea solution and the urea/ammonium salt-stream is sprayed as a mixture or separately via a feed system unit via various nozzles into the urea granulator onto a seed material. Thereby the highest amount of the urea/ammonium salt-stream is sprayed into the urea granulator at the granule flow inlet side and the amount of the urea/ammonium salt-stream is decreased alongside the axis of the urea granulator from the granule flow inlet side to the granule flow outlet side, and the highest amount of the urea solution is sprayed into the urea granulator at the granule flow outlet side and the amount of the urea solution is decreased alongside the axis of the urea granulator from the granule flow outlet side to the granule flow inlet side.

Optionally the total concentration of ammonium salts in the urea granules is up to 5 wt % ammonium salts, preferably being 0.5 to 1.5 wt %, having a nitrogen content of min 46 wt %. This ensures that a nitrogen content of min 46 wt % is reached in the urea granule and therefore it still is by definition a urea fertilizer grade product.

The granules therefore consist of a centre of a seed material as described above. This seed material is surrounded by subsequent layers composed of a mixture of ammonium salt and urea, whereby the urea concentration increases from the centre to the outer layer of the granule, whereby the outer layer of the granule contains up to 80 to 100% urea. Most preferably the outer layer of the granule contains 100% urea.

The benefit achieved with this arrangement is that layers composed of a mixture of ammonium salt and urea, with its low critical humidity, are totally enclosed by urea and therefore protected from the moisture in the ambient air. As a consequence the final product leaving the urea granulator exhibits the same resistance to moisture pick-up from the ambient air as urea granules composed of pure urea. This offers an opportunity to integrate ammonium salt streams, which are currently emitted by a conventional urea production process, into the urea granulator so that the urea fertilizer shows low moisture absorption tendencies. If a stream comprising ammonium salts would be introduced in a urea granulation process state of the art the produced end product would show high moisture absorption tendencies and a second coating step, for example with urea, would be needed. By using the current invention the need for additional coating systems for the produced end product is eliminated. Furthermore the recovered ammonia is included in the product; therefore the urea production is increased, leading to a significant economic benefit.

Figure 2:
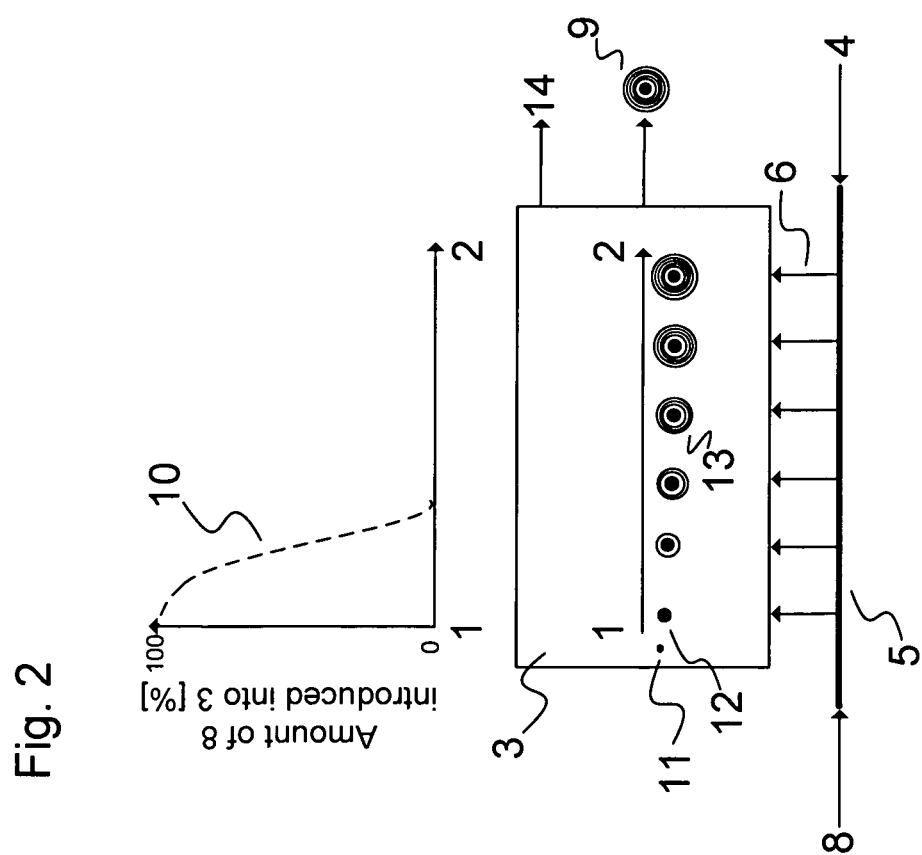
FIG. 2 illustrates one embodiment of the present invention for producing urea granules also containing ammonium compounds, and having a high critical humidity.

In the following, the invention is described in more detail by way of example. FIG. 2 shows a schematic block diagram with a urea granulator with a fluidized bed 3. A urea/ammonium salt-stream 8 is introduced into the urea granulator 3 at the granule flow inlet side 1 via a feed system 5. Whereby the urea solution 4 is introduced into the urea granulator 3 at the granule flow outlet side 2 via the feed system 5. Thereby the feed system 5 consists of one or more headers that are equipped with various spray nozzles 6 to introduce the urea/ammonium salt-stream 8 and the urea solution 4 into the urea granulator. Also the feed system 5 is equipped with means for adjusting the flow to the nozzles 6 to control and adjust the amount of urea/ammonium salt-stream 8 and/or urea solution 4 introduced into the urea granulator 3. Therefore the urea/ammonium salt-stream is sprayed onto the seed material 11 generally present in a urea granulator.

The amount of urea/ammonium salt-stream 8 fed into the urea granulator drops from the granule flow inlet side 1 to the granule flow outlet side 2, whereby it is nearly 100% at the granule flow inlet side 1. The amount of the urea solution is highest and preferably 100% at the granule flow outlet side 2 of the urea granulator 3.

By feeding the urea/ammonium salt-stream 8 in this way into the urea granulator 3 the ammonium salt concentration is reduced to nearly zero at the granule flow outlet side 2 of the urea granulator 3. For best results the amount of urea/ammonium salt-stream 8 fed into the urea granulator 3 is adjusted to zero within the first fifth alongside the axis of the granule flow inlet side 1 to the granule flow outlet side 2. This is shown exemplarily in graph 10. Graph 10 demonstrates the ideal amount of urea/ammonium salt-stream 8 present at the respective location in the urea granulator 3. In the final section of the granulator only urea solution 4 is sprayed onto the growing urea granules 13.

The urea granules therefore are built up in such a way that the ammonium salt contained in the urea/ammonium salt-stream 8 is in the centre of the urea granules 12 surrounding the seed material 11, while the subsequent layers of the growing urea granules 13 surrounding this centre of the urea granules 12 contain an increasing amount of urea and the final layer of the resulting inventive product 9 consists of urea only.

Hereby the urea/ammonium salt-stream 8 is released from a scrubbing system for the removal of ammonia from the off gas 14 of the urea granulator 3 or alternatively can be introduced separately into the feed system 5.

The advantages of the proposed invention are:
- enclosure of the ammonium salt, with its low critical humidity by urea and therefore protection from moisture in the ambient air in a one step process, so that no additional coating step is needed
- the final product exhibits the same resistance to moisture pick-up from the ambient air as urea granules, composed of pure urea.
- no further need for additional coating systems
- simple and cost-saving method
- integration into existing urea granulation apparatuses is possible
- a simple way is used to process ammonium salts in existing urea granulation plants without negatively influencing product quality
- A typical urea fertilizer grade product is produced. The product has a nitrogen content of min 46 wt % and therefore still is a urea fertilizer grade product.

KEY TO REFERENCED ITEMS 1 granule flow inlet side
2 granule flow outlet side
3 urea granulator
4 urea solution
5 feed system
6 spray nozzles
7 product
8 urea/ammonium salt-stream
9 resulting inventive product
10 graph demonstrating the amount of urea/ammonium salt-stream present at the respective location of the urea granulator
11 seed material
12 centre of the urea granule
13 growing urea granules
14 off-gas

The invention claimed is:

1. A method for producing urea granules having a low moisture absorption capacity, with a urea granulator having a granule flow inlet side and oppositely a granule flow outlet side, forming an axis between the inlet side and outlet side, comprising:
   a) spraying a urea solution and a urea/ammonium salt-stream, as a mixture or separately, via a feed system comprising a plurality of nozzles spaced along the axis into the urea granulator onto seed particles,
   b) adjusting the relative proportions of the urea solution and urea/ammonium salt-stream such that the highest amount of the urea/ammonium salt-stream is sprayed into the urea granulator at the granule flow inlet side and the amount of the urea/ammonium salt-stream is decreased along the axis of the urea granulator from the granule flow inlet side to the granule flow outlet side, and the highest amount of the urea solution is sprayed into the urea granulator proximate the granule flow outlet side and the amount of the urea solution is decreased alongside the axis of the urea granulator from the granule flow outlet side to the granule flow inlet side wherein the urea/ammonia salt-stream comprises a urea:ammonium salt ratio between 4 and 20, a water content of 0-10% by weight and optionally up to 5% by weight of additives.

2. The method of claim 1, wherein the urea/ammonium salt-stream introduced at the granule flow inlet side of the urea granulator comprises a urea:ammonium salt ratio between 7 and 16, a water content of 0-5% by weight and optionally between 0.4 to 0.8% by weight additives.

3. The method of claim 2, wherein at least one additive is present, and is selected from the group consisting of formaldehyde, aluminium sulphate, magnesium sulphate, micronutrients, and hydrocarbon granulation additives, and mixtures thereof.

4. The method of claim 1, wherein the urea solution introduced at the granule flow outlet side of the urea granulator comprises a water content of 0-10% by weight, and optionally up to 1.5% by weight additives, wherein the additives are selected from the group consisting of formaldehyde, aluminium sulphate, magnesium sulphate, micronutrients, and hydrocarbon granulation additives, and mixtures thereof.

5. The method of claim 1, wherein the composition of the seed material is chemically compatible with the urea granules produced, and the size of the seed material is smaller than the urea granules produced.

6. The method of claim 1, wherein the highest amount of the urea/ammonium salt-stream is sprayed into the urea granulator at the granule flow inlet side and the amount of the urea/ammonium salt-stream sprayed into the urea granulator along the axis is reduced to zero within the first half of the axis toward the granule flow outlet side.

7. The method of claim 1, further comprising obtaining the urea/ammonium salt-stream from a scrubbing system for the removal of ammonia from the off-gas of a urea granulator.

8. The method of claim 1, wherein the pressure of the urea/ammonium salt-stream entering the feed system unit at the granule flow inlet side of the urea granulator is higher than the pressure of the urea solution entering the feed system unit at the granule flow outlet side of the urea granulator.

9. The method of claim 1, wherein the highest amount of the urea/ammonium salt-stream is sprayed into the urea granulator at the granule flow inlet side and the amount of the urea/ammonium salt-stream sprayed into the urea granulator along the axis is reduced to zero within the first fifth of the axis toward the granule flow outlet side.

10. The method of claim 1, wherein the urea solution introduced at the granule flow outlet side of the urea granulator comprises a water content of 0-10% by weight, and optionally up to 1.5% by weight additives, wherein the additives are selected from the group consisting of formaldehyde, aluminium sulphate, magnesium sulphate, micronutrients, and hydrocarbon granulation additives, and mixtures thereof.

11. The method of claim 1, wherein the urea solution introduced at the granule flow outlet side of the urea granulator comprises a water content of 0-5% by weight and 0.4 to 0.8% by weight additives, wherein at least one additive is selected from the group consisting of formaldehyde, aluminium sulphate, magnesium sulphate, micronutrients, and other hydrocarbon granulation additives, and mixtures thereof.

12. The method of claim 1, wherein the seed particles comprise one or more of soil particles, sand, biodegradable plastics particles or urea particles.

13. The method of claim 1, wherein the average diameter of the seed particles is from 20-40% of the average diameter of the low moisture absorption capacity urea product.

14. The method of claim 1, wherein the urea granules consist of urea and ammonium salt(s).

15. Urea granules produced by the process of claim 1, having a decreasing gradient of ammonium salt content from an area adjacent a seed to the granule exterior.

16. The urea granules of claim 15, wherein the total concentration of ammonium salts in the urea granules is up to 5 wt % ammonium salts, and having a nitrogen content of minimally 46 wt %.

17. The urea granules of claim 15, wherein the total concentration of ammonium salts in the urea granules is from 0.5 to 1.5 wt % ammonium salts, and wherein the urea granules have a nitrogen content of minimally 46 wt %.

18. The urea granules of claim 15, wherein the urea granules consist of urea and ammonium salt(s).

19. The urea granules of claim 15, wherein the interior of the granule is a seed granule of soil, sand, or biodegradable plastic.

20. Urea granules produced by the process of claim 6, having a decreasing gradient of ammonium salt content from an area adjacent a seed to the granule exterior.

* * * * *